United States Patent [19]

Fulton et al.

[11] 4,076,511
[45] Feb. 28, 1978

[54] METHOD OF OPERATING A GLASS SHEET TEMPERING LINE

[75] Inventors: Robert C. Fulton, Monroeville; Donald L. Edmunds, Bethel Park; George B. Shields, Lower Burrell, all of Pa.

[73] Assignee: PPG Industries, Inc., Pittsburgh, Pa.

[21] Appl. No.: 759,151

[22] Filed: Jan. 13, 1977

[51] Int. Cl.² .............................................. C03B 27/00
[52] U.S. Cl. .......................................... 65/27; 65/104; 65/114
[58] Field of Search ................. 65/104, 114, 273, 275, 65/27, 159, 168, 165

[56] References Cited

U.S. PATENT DOCUMENTS

| 2,259,727 | 10/1941 | Bowers | 200/165 |
| 3,223,501 | 12/1965 | Fredley et al. | 65/25 A |
| 3,293,015 | 12/1966 | Fredley et al. | 65/104 X |
| 3,332,759 | 7/1967 | McMaster et al. | 65/25 A |
| 3,846,106 | 11/1974 | Seymour | 65/168 X |

Primary Examiner—Arthur D. Kellogg
Attorney, Agent, or Firm—Dennis G. Millman

[57] ABSTRACT

Removal of glass fragments from a glass sheet tempering quench apparatus is expedited by damping air flow simultaneously with opening of the quench chamber.

9 Claims, 2 Drawing Figures

METHOD OF OPERATING A GLASS SHEET TEMPERING LINE

BACKGROUND OF THE INVENTION

This invention relates to thermal tempering, or "heat strengthening," glass sheets or the like, and in particular to the quenching stage of the tempering process, where cooling blasts of gaseous tempering medium (usually air) are directed onto heated sheets of glass to quickly reduce the temperature of the surface portions of the sheets. More specifically, the invention is concerned with the type of quenching arrangement wherein the glass sheets are treated while in a generally horizontal or oblique orientation and their lower major surfaces are supported out of contact with solid structures by means of the fluid pressure of gaseous quenching blasts. Examples of gas-support quenches for tempering glass sheets may be seen in U.S. Pat. No. 3,223,501 to Fredley et al. and in U.S. Pat. No. 3,332,759 to McMaster et al.

Gas-support quenches can usually be operated with a high degree of reliability. However, due to the high stresses that are created in the glass by the tempering process, defects in the glass or non-uniformities or imbalances in the heating or cooling of the glass sheets can occasionally lead to glass breakage in the quench station. When breakage occurs, it is imperative that the broken glass fragments be removed immediately from the quench station before the next sheet of glass conveyed into the quench station collides with the stationary fragements to create a jam-up. If the next sheet comes into contact with the fragments, it too is likely to break, making the breakage problem more severe, or at least the glass sheet's surface may become marred. Not only is production lost by such a jam-up, but the accumulation of a large number of small glass fragments can clog the air passages, or cause a fragment to become lodged in a location where it may contact and mar several glass sheets subsequently conveyed through the quench station.

It is customary for operators to remove glass fragments from the quench with a hand-held rod or rake-like device which is thrust repeatedly between the upper and lower arrays of quench nozzles to knock the glass fragments out of the apparatus. But because the space between the upper and lower quench nozzles is relatively narrow, it is often difficult to complete the removal within the short time available (usually just a few seconds) before the next sheet enters the quench. Additionally, an operator's haste in attempting to quickly remove the fragments from the narrow space can sometimes cause damage to the quench nozzles.

A quench station usually has some provision for raising the upper nozzle section to gain better access to the interior, but it is generally inadvisable to do so during production to remove glass fragments. This is due to the fact that opening the quench eliminates the back-pressure effect of the opposed upper and lower arrays of nozzles, and the rate of flow is thereby increased, which has a number of undesirable consequences. One such consequence is that an unopposed flow from the lower nozzles can blow glass fragments violently out of the opened section. This result is not only hazardous to the operators, but can propel fragments into other sections of the tempering line where they may cause damage to the glass. Another drawback is that the increased air flow sometimes sends relatively cool currents of air upstream toward or into the heating chamber. As a result, glass sheets leaving the furnace at that time are heated non-uniformly or heated insufficiently for proper tempering, with the result that additional breakage may occur in the quench station or some of the glass sheets may not attain the desired temper.

Shutting off the blowers that supply the pressurized air to the quench nozzles is not a practical solution to the aforesaid problems. the large blowers which are required to supply air under pressure to the quench station need several minutes to come to a stop after they have been shut off. But since broken glass fragments must be removed within a few seconds to avoid subsequent sheets colliding with the fragments, such a delay would not be acceptable.

SUMMARY OF THE INVENTION

The present invention expedites the removal of broken glass from the quench station of a glass tempering operation by permitting the quench apparatus to be opened for easy access without the usual drawbacks associated therewith. This is accomplished by damping the air input stream simultaneously with the opening of the quench apparatus, and by providing coordinated control means to enable such simultaneous action. Thus, when glass breakage occurs, a section of the quench may be opened to provide easy access to the glass fragments so that they may be removed quickly and thoroughly, with less likelihood of damaging the apparatus. But because the invention permits air flow to be cut off or reduced as the quench section is opened, glass fragments are not blown about and no uncontrolled air currents affect the upstream portion of the tempering line.

THE DRAWINGS

DETAILED DESCRIPTION

The basic methods and apparatus for tempering glass sheets while supported on a gaseous layer are well known and need not be described at great length here. For example, the aforementioned U.S. Pat. Nos. 3,223,501 and 3,332,759 may be referred to for more specific details of the overall process, and their disclosures are hereby incorporated by reference for that purpose.

Figure 1:
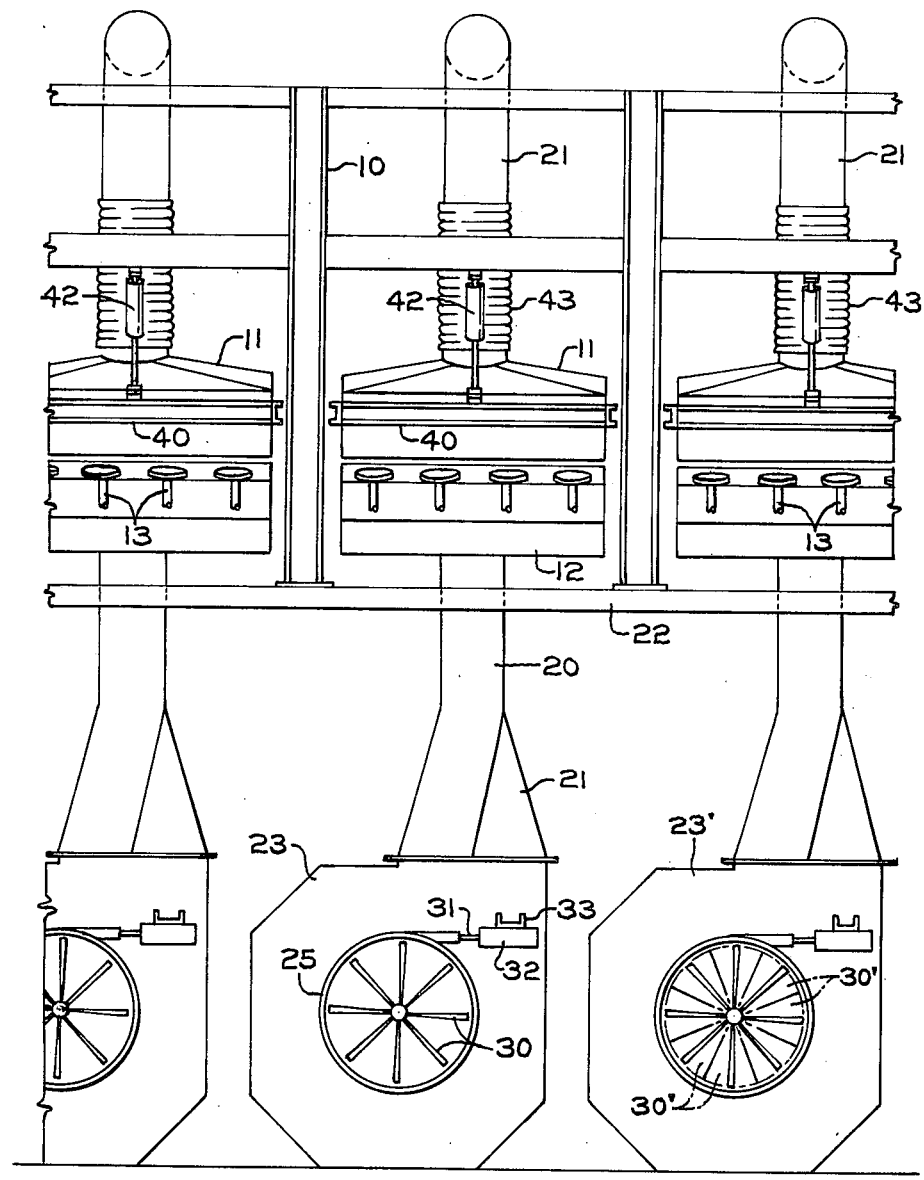
FIG. 1 is a fragmented side view of a typical glass sheet quenching station which includes a series of quench sections and a plurality of blowers on a lower floor, with which the present invention may be practiced.
Figure 2:
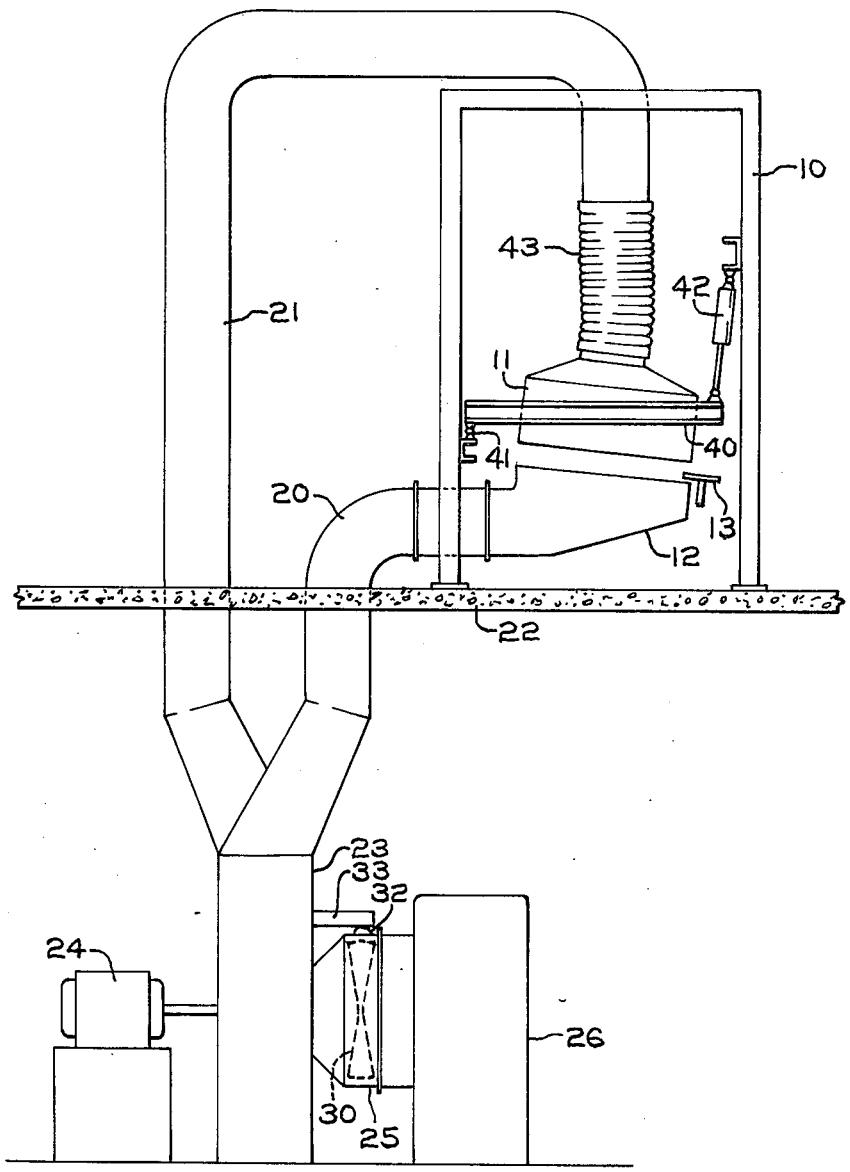
FIG. 2 is an end view, looking in the direction of glass travel, of the quenching station of FIG. 1.

In FIGS. 1 and 2 there is depicted, somewhat schematically, an example of a quenching station comprising a series of quench sections supported by a frame 10. Each quench section includes an upper quench box 11 having a downwardly facing surface overlying and spaced from an upwardly facing surface of a lower quench box 12, the space between the quench boxes defining a path for the glass sheets being tempered. Each quench box includes a large number of nozzles (not shown) adjacent to the glass path for directing streams of gaseous tempering medium (usually air) toward the surfaces of the glass sheets so as to rapidly cool the glass sheets which have been previously heated in a heating chamber (not shown). The nozzles may take the form of any suitably shaped orifices, including circular holes and elongated slots. The glass-facing surfaces of the quench boxes may be inclined a few degrees off horizontal so that an edge of each glass sheet bears against a series of edge drive wheels 13 which propel the glass sheets along the length of the quenching station.

Pressurized air is supplied to the low quench box 12 by a lower duct 20, and upper quench box 11 is supplied by an upper duct 21. Both ducts lead from a blower which is usually somewhat removed from the tempering line. In the drawings, a typical arrangement is shown wherein a series of blowers is located beneath a floor 22 on which the tempering line in located. Each quench section, comprising a pair of upper and lower quench boxes, is shown associated with a separate blower, but a single blower may sometimes be used to supply two or more quench chambers. The blowers may be of any large, commercially available type suitable for heavy industrial use. The blower illustrated consists principally of a fan (not shown) within a fan housing 23 and driven by an electric motor 24. Air is drawn in at the center of the housing through a cowl 25 and a filter unit 26. Within the cowl is a damper mechanism including a plurality of pivoted, pie-shaped vanes 30. The blowers in FIG. 1 are shown with the filter units 26 removed to expose the vanes 30. The dampers in FIG. 1 are open, with vanes 30 approximately parallel to the direction of air flow. One of the dampers, that associated with housing 23', illustrates the closed position in phantom lines, with vanes 30' rotated ninety degrees. Rotation of the vanes is effected by a mechanical linkage through a throw rod 31. In the preferred embodiment, the throw rod is shown arranged to be actuated by a remotely controlled pneumatic cylinder 32 supported on a bracket 33.

Upper quench box 11 is carried on a frame 40 which pivots at one end about a hinge means 41. The opposite end of frame 40 is attached to a pneumatic cylinder 42 which, in response to a control signal, lifts the frame 40 and the upper quench box 11 to open the quench section with which it is associated.

The means for actuating both the damping of the air flow and the opening of the quench chamber is preferably a single control switch, so that an operator could not fail to damp the air flow when the quench chamber is opened. But the only essential requirement is that control means be provided which enable an operator to perform both functions quickly and substantially simultaneously from a location near the quench chamber to be opened. This may take the form of separate side-by-side switches, for example. Moreover, the damper need not be actuated by a cylinder, but may be directly controlled from the vicinity of the quench line by means of mechanical linkages or hydraulic means.

In the illustrated embodiment, it was convenient to use vanes 30 at the blower inlet as the damper means since they had already been installed by the blower manufacturer for other purposes. But damper means could be installed instead at any suitable location in the air supply system, such as at the output end of the blower, and in particular, in the lower duct 20. The damper may be designed to block air flow, either fully or partially, or it may divert the air stream to a bypass duct.

It should be understood that other variations and modifications as are known to those in the art may be resorted to without departing from the spirit and scope of the present invention as defined by the appended claims.

We claim:

1. In the method of tempering glass sheets by heating glass sheets to a temperature suitable for tempering and then rapidly cooling surface portions of the glass sheets by directing streams by gaseous tempering medium at opposite sides of the glass sheets from opposed, closely spaced upper and lower arrays of nozzles between which the glass sheets pass while the glass sheets are supported out of contact with the lower array of nozzles by a layer of said gaseous tempering medium, wherein the streams of gaseous tempering medium are propelled by large blowers which require a substantial amount of time to halt, and wherein accidental breakage of glass sheets occasionally requires removal of glass fragments from between said arrays of nozzles, the improvement comprising upon the occurrence of glass breakage, substantially simultaneously damping the flow of tempering medium to at least one lower nozzle array section to a sufficient degree to avoid blowing glass fragments out of said lower nozzle array section without significantly reducing blower speed, and increasing the separation between said lower nozzle array section and its corresponding upper nozzle array section so as to render glass fragments more accessible for removal.

2. The method of claim 1 wherein the separation between the upper and lower nozzle array sections is increased by raising the upper nozzle array section by means responsive to an input signal.

3. The method of claim 2 wherein the flow of tempering medium is damped by damper means actuated in response to said input signal.

4. The method of claim 3 wherein the tempering medium directed onto the glass surfaces is air.

5. The method of claim 1 wherein said damping step includes damping the tempering medium flow to both upper and lower nozzle arrays.

6. The method of claim 1 wherein said damping step includes diverting the tempering medium flow away from the upper and lower arrays of nozzles.

7. The method of claim 3 wherein input signal actuates a cylinder which operates the damper means.

8. The method of claim 1 wherein said damping step includes restricting the incoming flow of tempering medium into a blower which supplies pressurized tempering medium to the arrays of nozzles.

9. The method of claim 1 wherein said damping step includes restricting the output flow of tempering medium from a blower which supplies pressurized tempering medium to the arrays of nozzles.

* * * * *